G. ROPES.
MANUFACTURE OF KNIVES AND FORKS.
No. 737. Patented May 10, 1838.
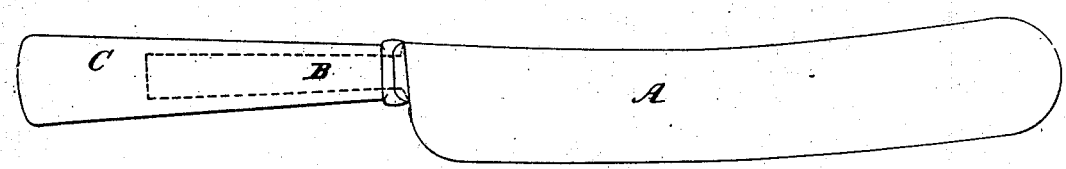
FIG. 1.
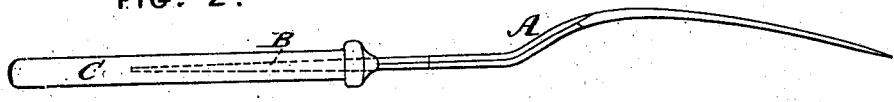
FIG. 2.
FIG. 3.

UNITED STATES PATENT OFFICE.

GEO. ROPES, OF PORTLAND, MAINE.

MODE OF MAKING TABLE KNIVES AND FORKS.

Specification of Letters Patent No. 737, dated May 10, 1838.

*To all whom it may concern:*

Be it known that I, GEORGE ROPES, of Portland, in the county of Cumberland, State of Maine, have invented new and useful Improvements in Table Knives and Forks, of which I do hereby declare the following to be a full and exact description.

The nature of my invention consists in cutting both the blade and start of the common table knife in one piece without the bolster from a sheet of steel (instead of making it as heretofore practised by welding the iron start on to the steel blade,) and affixing to the knife and also to the common table fork that projection commonly called the bolster, by casting, riveting, soldering or driving it on to the start of the knife or fork after the blades and starts are made as above described. And also in connecting the bolster with the handle of the knife or fork and then riveting, soldering or otherwise affixing the handle to the start of the knife or fork. And also in casting the handle both of the common table knife and table fork of britannia or other metal on to the start of the knife or fork instead of riveting, soldering, or cementing it on, as heretofore practised, thus making a handle less liable to be affected by water and more durable than any other kind.

To enable others skilled in the arts to make and use my invention, I proceed to describe its construction and application. I first form both the blade, (A, Fig. 1) and start, (B,) either of the table knife or fork in a single piece by cutting it from a sheet of steel of the requisite thickness, and then, after grinding, tempering, and polishing it in the usual manner, I form the bolster (C, Fig. 2) by placing the start (B, Fig. 1) in a suitable mold and pouring melted britannia or other metal around it. Or, after cutting out the knife and fork as above described, I make the bolster of iron or other metal in a separate piece, either by casting it in a suitable mold, or by stamping it out of a sheet of metal of the requisite thickness with dies prepared for the purpose, and then rivet, solder or otherwise affix it to the start of the knife or fork. After the knife or fork is thus prepared by affixing a bolster to it, it may be finished with a handle of horn, bone or other material or the common method. Or I connect the bolster with the handle as in Fig. 3, E and F, and fasten both together on to the start of the knife or fork. In order to apply the cast metal handle, either separate from, or in connection with, a bolster, to the table knife or fork according to my invention, after cutting out, grinding and polishing as above directed, inclose the start in a mold of the requisite shape, and pour into it any metal suitable for the purpose.

What I claim as my invention, and desire to secure by Letters Patent, consists in—

1. Making the blade and start of the common table knife, except the bolster, in a single piece, by cutting from sheet steel, instead of making the start in a separate piece and welding it on to the steel blade as heretofore done, and for fastening the bolster on to the table knife or table fork in either or all of the methods above described, and also for making the bolster of the table knife or fork by either of the methods above described.

2. I also claim as my invention the making of the handles of common table knives and forks of any suitable metal, by casting them on, either in connection with, or separate from, the bolster, as above described.

Portland May 2nd 1838.

GEO. ROPES.

Witnesses:
N. DEERING,
SAMUEL FESSENDEN.